Sept. 15, 1970 L. E. CAMERON ET AL 3,529,181

THYRISTOR SWITCH

Filed April 19, 1968 2 Sheets-Sheet 1

INVENTORS L. E. CAMERON
R. P. MASSEY
BY B. F. Stoddard
ATTORNEY

Sept. 15, 1970 L. E. CAMERON ET AL 3,529,181

THYRISTOR SWITCH

Filed April 19, 1968 2 Sheets-Sheet 2

United States Patent Office 3,529,181
Patented Sept. 15, 1970

3,529,181
THYRISTOR SWITCH

Leon E. Cameron, Morris Plains, and Richard P. Massey, Westfield, N.J., assignors to Bell Telephone Laboratories, Incorporated, Murray Hill, N.J., a corporation of New York Filed Apr. 19, 1968, Ser. No. 722,704
Int. Cl. H03k *1/18*
U.S. Cl. 307—265 9 Claims

ABSTRACT OF THE DISCLOSURE

An improved variable width pulse modulator having fast-acting pulse-terminating means for effecting an appreciable reduction in the time interval between the application of terminating trigger current and the actual termination of the associated pulse. The improvement comprises a pair of diodes connected between the load circuit and the resonant turn-off circuit for normally blocking the second half-cycle of reverse ringing current. These diodes are bridged by a pulse-terminating thyristor which, when turned on by trigger current, quickly releases the ringing current to effect the termination of the pulse.

GOVERNMENT CONTRACT

The invention herein claimed was made in the course of, or under contract with the Department of the Army.

BACKGROUND OF THE INVENTION

This invention relates to an improved semiconductor switch capable of operating at rapid speeds in high power circuits for producing rectangular pulses, and more particularly, to means for effecting an appreciable reduction in the time interval between the application of terminating trigger current and the actual termination of the associated output pulse.

Semiconductor switches of the prior art have used a variety of semiconductor devices. The semiconductor devices most commonly used in switch circuits are four-layer PNPN devices known as silicon controlled rectifiers or thyristors. As is well known, a PNPN device is usually provided with three terminals and has properties somewhat analogous to a gas-filled thyratron and, like the thyratron, once it is switched on, it remains conductive until a turn-off mechanism is operated. Although the operating speed of the thyristor is inherently much greater than that of the thyratron, some utilization circuits require faster operating speeds than those for which a thyristor is inherently capable.

The need for faster operating speeds has been met by a prior art thyristor switch circuit which is disclosed and claimed in a copending patent application filed by W. B. Harris, R. P. Massey, and F. J. Zgebura. This prior application, bearing Ser. No. 537,544, was filed on Mar. 25, 1966 and is assigned to the same assignee as the present application. The circuit of this copending application is described in detail hereinafter with reference to FIG. 1 of the drawing wherein it can be seen that the switch circuit employs a single thyristor and a simple resonant turn-off circuit comprising a series connected inductor and capacitor. An impedance is connected between the gate and cathode of the thyristor to reduce false triggering from the rate effect. Both the rate effect and the turn-off capabilities are improved by connecting a diode between the gate and cathode of the thyristor, and another diode between the gate and anode of the thyristor. These diodes, which may be called reverse current diodes, are so constructed that the reverse recovery time of the middle junction in the thyristor is less than that of the first diode and greater than that of the second diode.

When this prior art thyristor switch is used in a variable width pulse modulator, it is not completely satisfactory for all purposes. The reason for this is that technological advances have developed increasing needs for still faster switching circuits. One of the obstacles to meeting these needs is that the time interval between the application of a terminating trigger pulse and the actual termination of the output pulse developed across the load circuit has been the time interval required for the ringing current produced in the resonant turn-off circuit to complete one full cycle. Thus, there is a need for means for shortening this time interval so as to produce faster switching action.

SUMMARY OF THE INVENTION

The present invention is designed to fulfill the above-mentioned need by appreciably reducing the time interval between the application of a terminating trigger pulse in a variable width pulse modulator and the actual termination of the output pulse. This is accomplished by employing means including a variable delay circuit for enabling a starting trigger pulse to also function as a terminating trigger pulse. In addition, a pair of diodes are connected between the pulse-forming thyristor and the resonant means so as to normally block the second half-cycle of the ringing current. These diodes are bridged by a shunt circuit which includes a pulse-terminating thyristor.

When this pulse-terminating thyristor is fired by the trigger pulse at the expiration of the delay period of the delay circuit, it closes the shunt path across the diodes. This releases the second half-cycle of ringing current which now functions to assist the pulse-forming thyristor to quickly recover its forward-blocking capability thereby terminating the output pulse. Thus, the rapidity of the switching action is increased because the time interval between the application of the terminating trigger current and the actual termination of the output pulse is now equal to only one-half cycle of the ringing current instead of a full cycle as was required heretofore.

BRIEF DESCRIPTION OF THE DRAWING

The features of this invention are fully discussed hereinafter in relation to the following detailed description of the drawing in which.

DETAILED DESCRIPTION

Figure 1:
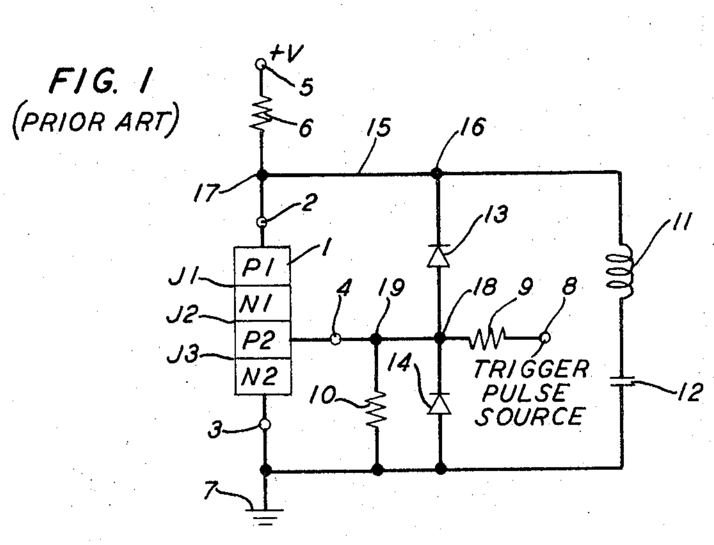
FIG. 1 (PRIOR ART)
FIG. 1 illustrates the thyristor switch of the above-mentioned copending application.

The switch circuit of the above-mentioned copending patent application is shown in FIG. 1 as utilizing a single thyristor 1 comprising four layers having regions P1, N1, P2, and N2 with junctions J1, J2, and J3 between them. The thyristor 1 is provided with an anode terminal 2 connected to the upper outer layer P1, a cathode terminal 3 connected to the lower outer layer N2, and a gate terminal 4 connected to the lower intermediate layer P2. A power supply source of direct voltage has its positive side connected to a terminal 5. The terminal 5 is coupled through a utilization circuit, which is represented symbolically by a load resistor 6, to the anode terminal 2. The cathode terminal 3 is connected to a source 7 of ground potential which is to be understood as being connected to the negative side of the source 5 of direct voltage.

The switch circuit further includes a terminal 8 which extends to an external source of trigger pulse current. The terminal 8 is coupled through a resistor 9 and the points 18 and 19 to the gate terminal 4. A resistor 10 is connected between the point 19 and the source 7 of ground potential. As is well known in the art, a positive trigger pulse applied to the terminal 8 will cause current to flow through the divider resistors 9 and 10 thereby producing a potential difference between the gate terminal 4 and the cathode terminal 3. This functions to trigger the thyristor 1 by substantially reducing the impedance between the anode terminal 2 and the cathode terminal 3. The triggering of the thyristor 1 causes current to flow from the source 5 of positive direct voltage, through the load resistor 6, through the anode-cathode path in the thyristor 1 to the ground 7, and then back to the negative side of the direct voltage supply.

At this point, attention should be directed to a resonant turn-off circuit that comprises an inductor 11 and a capacitor 12 which are serially connected across the anode terminal 2 and the cathode terminal 3. Prior to the triggering of the thyristor 1, the capacitor 12 is charged to the same potential as that of the source 5 of direct voltage over a path extending from the resistor 6, along the lead 15, and then through the inductor 11 to the capacitor 12.

When the thyristor 1 is triggered, it becomes conductive and initiates the generation of a pulse across the load resistor 6. Also, at this time, the capacitor 12 discharges and initiates a flow of ringing current. The first half-cycle of this ringing current flows from the capacitor 12 through the inductor 11, over the lead 15, through the thyristor 1 in the forward direction, and then back to the capacitor 12.

At the beginning of the second half-cycle, the ringing current reverses in phase and flows through the thyristor 1 in the reverse direction. The values of the capacitor 12 and the inductor 11 are so selected as to cause the magnitude of the reverse ringing current to quickly exceed the magnitude of the normal load current. This produces a net reverse current which flows from the cathode terminal 3, through all three of the junctions J3, J2, and J1, and then to the anode terminal 2.

In order to reduce the time required to restore the forward-blocking capability of the thyristor 1 and also to improve its dynamic breakdown capability, two diodes 13 and 14 are serially connected across the anode terminal 2 and the cathode terminal 3, and are also connected across the inductor 11 and the capacitor 12. It can be seen in FIG. 1 that this connection uses the lead 15 for connecting a point 16 between the inductor 11 and the upper diode 13 to a point 17 between the load resistor 6 and the anode terminal 2. The point 18 between the diodes 13 and 14 is joined to the conductor extending from the gate terminal 4 to the resistor 9 and the source 8 of trigger pulse current.

As is described in the above-mentioned copending application, the lower diode 14 has a reverse recovery time which is longer than the reverse recovery time of the middle junction J2 of the thyristor 1. Conversely, the upper diode 13 has a reverse recovery time which is less than the reverse recovery time of the junction J2. In other words, the reverse recovery time of the middle junction J2 is less than that of the lower diode 14 and is greater than that of the upper diode 13.

It should be noted that at the beginning of the second half-cycle of the ringing current, the ringing current will be a reverse current for the two outer junctions J1 and J3 but will be a forward current for the middle junction J2. Therefore, the slow recovery diode 14 will be momentarily reverse biased by the charge stored in the lower junction J3 while the fast recovery diode 13 will be biased below its threshold voltage by the opposed charges in junctions J1 and J2. This condition of the diodes 13 and 14 permits the reverse ringing current to flow through the thyristor 1 at the start of the second half-cycle.

The flow of reverse ringing current quickly functions to reduce the charge density in junction J3 to zero thereby causing it to recover and open. During the transition in junction J3, current will begin to flow through the lower diode 14 and will increase to the point at which the diode 14 will be carrying all of the reverse ringing current. At this time, the reverse current will flow from the capacitor 12, through the lower diode 14, through the gate terminal 4 and into the middle junction J2, out through the upper junction J1, and then to the inductor 11. Thus, the recovery of the lower junction J3 does not terminate the pulse since the pulse current across the load resistor 6 is maintained because it is superimposed upon the reverse ringing current which is now flowing through the lower diode 14.

Since the reverse ringing current is also a reverse current for the upper junction J1, the junction J1 will partially recover during the time that the lower junction J3 is carrying reverse current. After the lower junction J3 fully recovers, the above-described flow of reverse current through the lower diode 14 and the middle junction J2 will force the upper junction J1 to complete its recovery thereby reducing its charge density to zero. In other words, the upper junction J1 is forced to recover due to a forward current flowing through the middle junction J2.

While this change in junction J1 is occurring, the current flowing through junctions J1 and J2 will be reduced toward zero and the current flowing through the fast recovery diode 13 will be correspondingly increased to the limit of the reverse ringing current. This flow of current through the upper diode 13 will cause an additional charge to be stored in the lower diode 14. It should be noted that, since the middle junction J2 had been forward biased, the charge density now existing in this junction J2 is not zero and it begins to recover by recombination. The thyristor 1 is now open at both junctions J1 and J3 and further reverse current is unnecessary except to store more charge in the slow recovery diode 14.

During the latter portion of the second half-cycle of ringing current, the magnitude of the ringing current becomes smaller than the magnitude of the load current. Since the reverse recovery time of the upper diode 13 is less than the reverse recovery time of the middle junction J2, the diode 13 recovers and a second forward current is now applied to the thyristor 1. This current flows in the forward direction through the upper junction J1 and in the reverse direction through the middle junction J2 and the lower diode 14. Accordingly, this current forces the middle junction J2 to recover before the diode 14 recovers by recombination. The recovery of the middle junction J2 turns off the thyristor 1 thereby terminating the pulse. Shortly thereafter, when the diode 14 finally completes its recovery, the switch circuit becomes ready for generating another pulse.

By thus designing diode 14 to recover more slowly than the middle junction J2, gate triggering of the thyristor 1 is prevented as is explained in the above-mentioned copending patent application. In addition, this provides a low impedance between the cathode terminal 3 and the gate terminal 4 for a short interval after the thyristor 1 recovers and thus improves the rate effect capability of this switch circuit.

Figure 2:
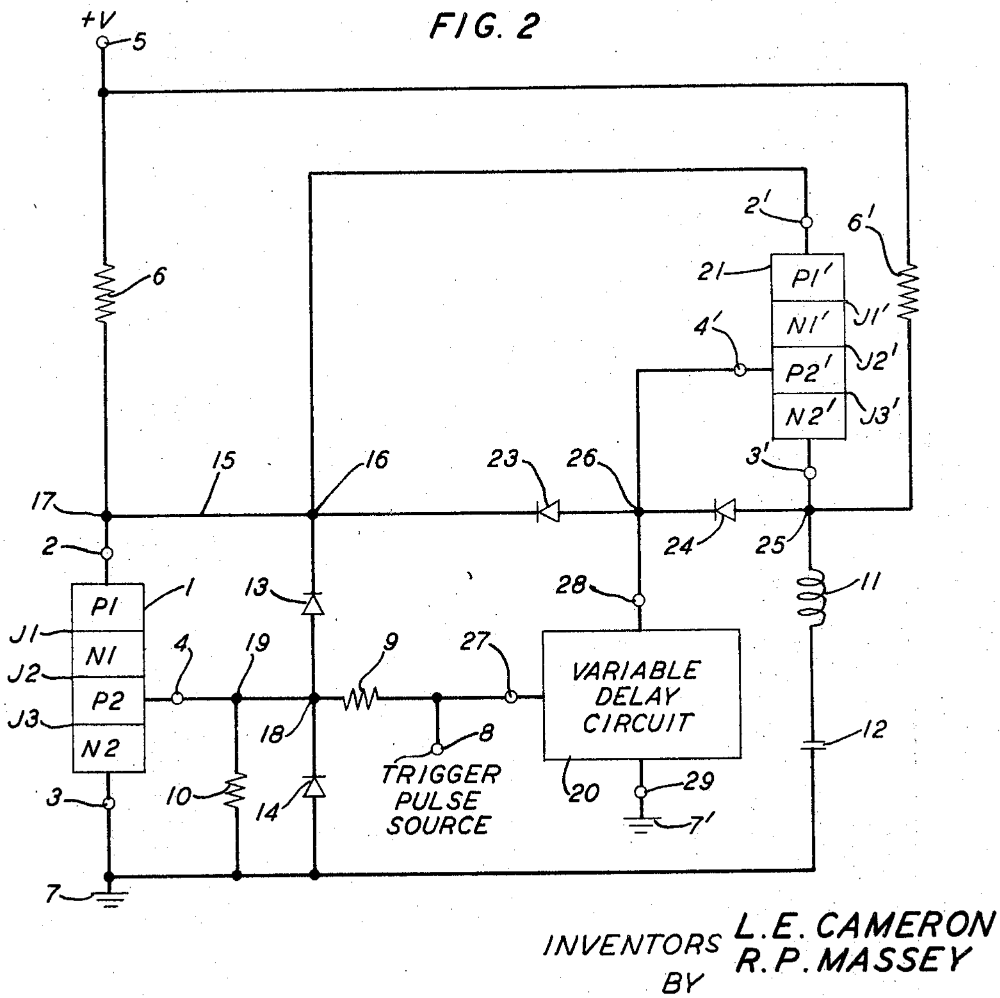
FIG. 2 shows the thyristor switch of FIG. 1 incorporated in a variable pulse width modulator in accordance with this invention.

The thyristor switch of FIG. 1 can be adapted to function as a variable width pulse modulator by employing means for delaying or blocking the second, or reverse, half-cycle of the ringing current. This can be accomplished in the manner shown in FIG. 2 by inserting two serially connected diodes 23 and 24 between the upper end of the inductor 11 and the point 16. Since the circuit of FIG. 2 is a modification of that shown in FIG. 1, those elements of FIG. 2 that are the same as those in FIG. 1 have been identified by giving them the same reference designations. The diode 23 is similar to the diode 13 in that it has a fast reverse recovery time, and the diode 24 is similar to the diode 14 in that it has a slow reverse recovery time.

As is indicated in FIG. 2, which is an exemplary embodiment of the invention, the diodes 23 and 24 are connected in such a manner that they will permit the forward, of first, half-cycle of the ringing current to flow through them but will block the flow of the reverse half-cycle of ringing current. This prevents the thyristor 1 from recovering its forward-blocking capability.

Therefore, in order to obtain a pulse of variable width some means for overcoming the effect of the diodes 23 and 24 must be employed. This is accomplished in accordance with this invention by connecting a shunt circuit across the diodes 23 and 24 and by providing means, represented by a second thyristor 21, for, in effect, controlling the opening and closing of this shunt circuit. The second thyristor 21 comprises four layers $P1^1$, $N1^1$, $P2^1$, and $N^2$ with junctions $J1^1$, $J2^1$, and $J3^1$, between them.

The thyristor 21 also has an anode terminal $2^1$, a cathode terminal $3^1$, and a gate terminal $4^1$. As is shown in FIG. 2, the anode terminal $2^1$ is connected to the point 16 near the cathode side of the fast diode 23, the cathode terminal $3^1$ is connected to a point 25 near the anode side of the slow diode 24, and the gate terminal $4^1$ is connected to a point 26 which is between the anode of the diode 23 and the cathode of the diode 24.

With this cricuit construction, when the second thyristor 21 is fired and becomes conductive, it, in effect, closes the shunt path across the diodes 23 and 24. This discontinues the blocking effect of the diodes 23 and 24 thereby allowing the first thyristor 1 to recover its forward-blocking capability whereby the pulse is terminated.

In order to variably control the firing of the second thyristor 21, the same trigger pulse that is used to start the generation of an output pulse across the load resistor 6 is applied through a variable delay circuit 20 to the second thyristor 21 so as to function as a terminating trigger pulse. This delay circuit 20 may be any suitable type that is commercially available and it is provided with an input terminal 27, an output terminal 28, and a ground terminal 29 leading to a source $7^1$ of ground potential. The input terminal 27 is connected to the source 8 of trigger pulse current, and the output terminal 28 is connected through the point 26 to the gate terminal $4^1$ of the second thyristor 21. The delay circuit 20 further includes adjustable means, well known to those skilled in the art, for providing variable lengths of delay in the passage therethrough of a trigger pulse.

It is to be understood that the invention is not restricted to the use of a single trigger pulse in combination with a delay circuit to effect the starting and stopping of an output pulse. The invention can employ a separate trigger pulse for starting an output pulse which can be terminated by means of a different trigger pulse. In this case, the starting pulse would be applied in the same manner as is indicated in FIG. 1 and the terminating pulse could be applied directly to the gate terminal $4^1$ of the second thyristor 21. Variable pulse width would be obtained by varying the time of application of the terminating pulse.

It should be noted that a resistor $6^1$ is connected between the power supply source 5 and the point 25. This resistor $6^1$ is made relatively large so as to retard leakage of the charge on the capacitor 12. Such leakage would be undesirable because it would effect a reduction of the maximum extent to which the width of a pulse could be increased.

The thyristor switch of FIG. 2 is put into operation in the same manner as that of FIG. 1; namely, in response to a positive trigger pulse supplied from the source 8. This functions to fire the thyristor 1 in the manner described above thereby initiating the generation of an output pulse across the load resistor 6. This starting trigger pulse is also applied to the variable delay circuit 20 but does not produce an immediate effect upon the second thyristor 21. The capacitor 12 discharges to produce a ringing current as was described above, The first half-cycle of this ringing current flows through the diodes 24 and 23 and then through the thyristor 1 in the forward direction. It produces no effect on the second thyristor 21 because the variable delay circuit 20 blocks the flow of trigger pulse current to the second thyristor 21 at this time.

At the beginning of the second half-cycle, the ringing current reverses in polarity and attempts to flow through the thyristor 1 in the reverse direction which would be from the lower side of the capacitor 12 to the cathode terminal 3 of the thyristor 1, through the thyristor 1 in the reverse direction, along the lead 15 to point 16, and then back to the upper side of the capacitor 12. However, as was stated above, the diodes 23 and 24 are poled so as to block the flow of ringing current in the reverse direction. Accordingly, the thyristor 1 is prevented from recovering its forward-blocking capability and remains conductive thereby preserving the output pulse.

When the trigger pulse current is released by the delay circuit 20 at the end of its delay period and is applied to the gate terminal $4^1$ of the second thyristor 21 for functioning as a terminating trigger pulse, this second thyristor 21 will become conductive thereby closing the shunt path across the diodes 23 and 24. This immediately enables the second half-cycle of ringing current to perform its funciton of assisting the first thyristor 1 to quickly recover its forward-blocking capability thereby terminating the pulse.

Figure 3A:
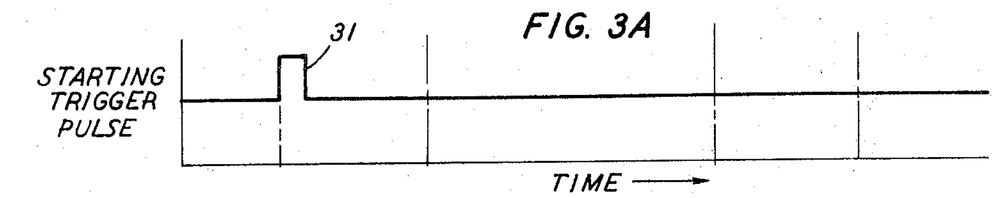
FIGS. 3A to 3E, inclusive, are synchrograms illustrating the time relationships between different operating steps of the circuit of FIG. 2.
Figure 3B:
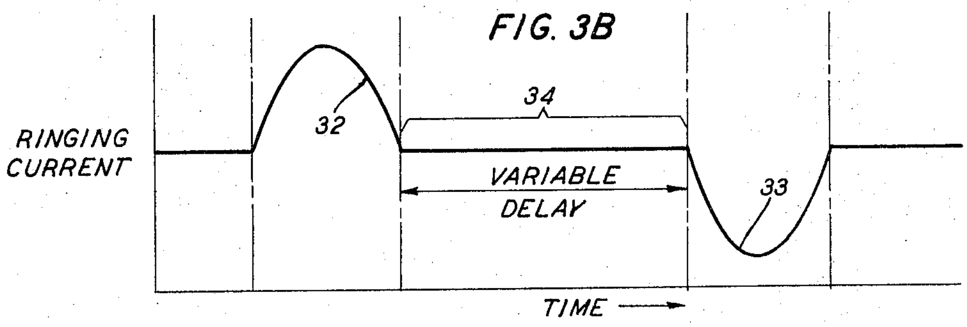
Figure 3C:
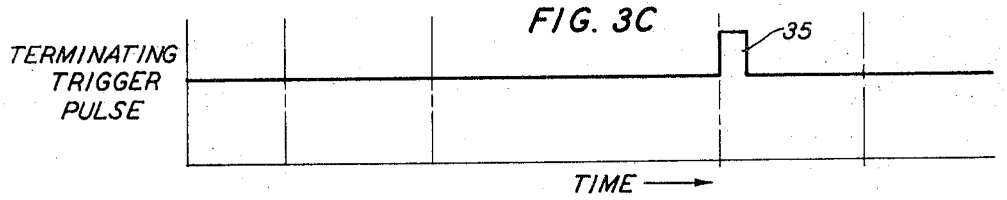
Figure 3D:
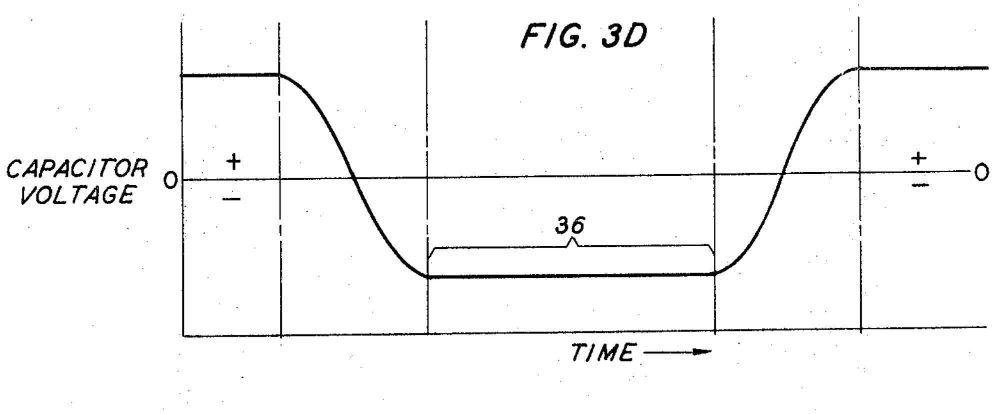
Figure 3E:
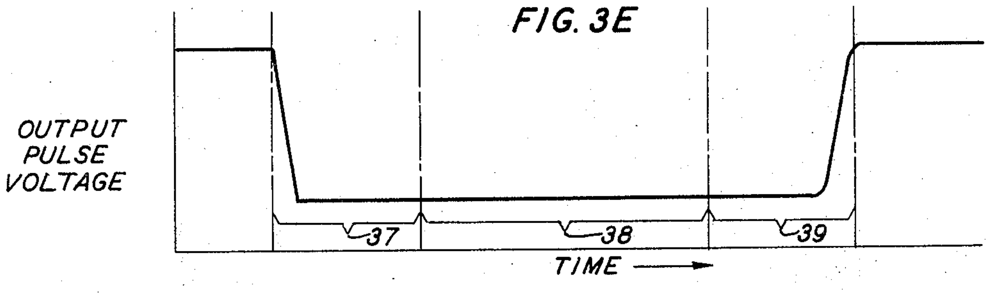

The various phases of the operation of this thyristor switch are illustrated in the synchrograms shown in FIGS. 3A to 3E, inclusive. Since these figures all have the same time scale, the various operating steps are represented in their actual time relationships to each other. Thus, FIG. 3A shows the time position 31 of the starting trigger pulse which is applied to the gate terminal 4 of the first thyristor 1 for starting the operation of this thyristor switch. In FIG. 3B, the first, or forward, half-cycle of the ringing current is indicated by the reference numeral 32 and the second, or reverse, half-cycle is represented by the reference numeral 33. The space between the end of the first half-cycle 32 and the beginning of the second half-cycle 33 is designated by the reference numeral 34 and represents the delay period of the delay circuit 20.

In FIG. 3, the reference numeral 35 illustrates the time position of the trigger pulse when it arrives at the gate terminal $4^1$ of the second thyristor 21 for functioning as a terminating trigger pulse. It can be seen that this position 35 of the trigger pulse begins at the same point in time as the expiration of the delay period 34 shown in FIG. 3B. The discharge voltage of the capacitor 12 is represented in FIG. 3D wherein the flat section corresponds with the delay period 34 shown in FIG. 3B. Finally, the pulse voltage is illustrated in FIG. 3E wherein its left portion 37 is formed during the first half-cycle of ringing current, its intermediate portion 38 is determined by the delay period of the delay circuit 20, and its right portion 39 is formed during the second half-cycle of ringing current.

Thus, it can be understood that the width of the pulse can be readily varied by adjusting the delay circuit 20 so as to vary the duration of the intermediate portion 38 of the pulse. It should be especially noted that the time interval between the end of the variable delay period and the termination of the output pulse is equal to only one-half cycle of ringing current.

In other words, after the second thyristor 21 is fired by the terminating trigger pulse, the output pulse is terminated within a time interval that is equal to only one-half cycle of the ringing current. This is a desirable advantage not only in the case of the circuit of FIG. 2 but also in the case described above which, as in some radar circuits, uses two separate trigger pulse sources, one for starting the output pulse and the other for terminating the output pulse. It is particularly useful in radar circuits to be able to effect an appreciable reduction in the time interval between the application of the terminating trigger current and the actual termination of the output pulse. Therefore, this is an important improvement in the art of variable pulse modulators because it increases the rapidity of the switching action.

What is claimed is:

1. A thyristor switch circuit adapted for generating a pulse of electric energy, said switch circuit comprising a source of electric power, a first thyristor having anode, cathode, and gate terminals, a utilization circuit coupling said source of electric power to said anode terminal, starting means adapted for triggering said thyristor for rendering it conductive whereby an output pulse is generated across said utilization circuit, said starting means including a source of trigger pulse energy and means for connecting said source to said gate terminal for triggering said thyristor, and a resonant turn-off circuit adapted for producing a cycle of ringing current for turning off said thyristor and for effecting the termination of the generation of said pulse, said turn-off circuit having one side connected to said anode terminal and another side connected to said cathode terminal, said cycle of ringing current comprising a first half-cycle and a second half-cycle, said thyristor switch circuit being characterized by having pulse-widening means for increasing the width of said output pulse, said pulse-widening means comprising at least one diode connected in said turn-off circuit, and said diode being so poled as to block the flow of said second half-cycle of ringing current.

2. A thyristor switch circuit in accordance with claim 1 wherein said pulse-widening means further comprise means for overcoming the blocking effect of said diode, said last-mentioned means including a shunt circuit connected across said diode and also connected into said turn-off circuit.

3. A thyristor switch circuit in accordance with claim 2 wherein said pulse-widening means further comprise means for controlling the opening and closing of said shunt circuit, said last-mentioned means including a second thyristor having anode and cathode terminals, said anode terminal of said second thyristor being connected to one side of said shunt circuit and said cathode terminal of said second thyristor being connected to another side of said shunt circuit.

4. A thyristor switch circuit in accordance with claim 3 wherein said second thyristor includes a gate terminal, and further comprising firing means adapted for applying a trigger pulse to said last-mentioned gate terminal for triggering said second thyristor for rendering it conductive whereby an electrically conductive path is established between said two sides of said shunt circuit.

5. A thyristor switch circuit in accordance with claim 4 wherein said firing means include circuit means for connecting said last-mentioned gate terminal to said source of trigger pulse energy.

6. A thyristor switch circuit in accordance with claim 5 wherein said circuit means include a delay circuit adapted for delaying the passage of a trigger pulse from said source of trigger pulse energy to said last-mentioned gate terminal.

7. A pulse modulator adapted for generating pulses of variable widths, said pulse modulator comprising a thyristor adapted for generating a pulse, a resonant turn-off circuit adapted for producing a cycle of ringing current having a first half-cycle and a second half-cycle, said turn-off circuit having means adapted for applying said second half-cycle to said thyristor for terminating said pulse, said pulse modulator including variable pulse-widening means for varying the width of said pulse, said pulse-widening means being characterized by having blocking means for blocking the flow of only said second half-cycle of ringing current to said first thyristor for variable lengths of time, said blocking means including at least one diode so poled as to block the flow of said first half-cycle of ringing current.

8. A pulse modulator adapted for generating pulses of variable widths, said pulse modulator comprising a thyristor adapted for generating a pulse, a resonant turn-off circuit adapted for producing a cycle of ringing current having a first half-cycle and a second half-cycle, said turn-off circuit having means adapted for applying said second half-cycle to said thyristor for terminating said pulse, said pulse modulator including variable pulse-widening means for varying the width of said pulse, said pulse-widening means being characterized by having means for blocking only the flow of said second half-cycle of ringing current to said first thyristor, and means responsive to the expiration of a variable time period for overcoming said blocking means and for then applying said second half-cycle of ringing current to said thyristor for terminating said pulse.

9. A pulse modulator adapted for generating a pulse, said pulse modulator having a first thyristor and a second thyristor, means adapted for applying trigger pulse energy to said first thyristor for firing it and for rendering it conductive, said first thyristor being adapted when rendered conductive to initiate the generation of a pulse, means adapted for applying trigger pulse energy to said second thyristor for firing it and for rendering it conductive, said second thyristor being adapted when rendered conductive to initiate the termination of said pulse, a resonant circuit adapted for producing a cycle of ringing current having a first half-cycle and a second half-cycle, each of said half-cycles having an equal time period, said pulse modulator being characterized by having means for completing the termination of said pulse within a fixed time interval after said application of trigger pulse energy to said second thyristor, said time interval being equal to said time period of one of said half-cycles of ringing current, said last-mentioned means including means adapted for blocking the flow of said second half-cycle of ringing current, and means responsive to said firing of said second thyristor for unblocking the flow of said second half-cycle of ringing current and for applying it to said first thyristor for rendering said first thyristor non-conductive.

References Cited

UNITED STATES PATENTS

| | | | |
|---|---|---|---|
| 3,204,123 | 8/1965 | Mahoney et al. | 307—284 |
| 3,346,745 | 10/1967 | Harris | 307—284 |
| 3,359,498 | 12/1967 | Harris | 307—284 |
| 3,396,293 | 8/1968 | Harris | 307—265 |
| 3,479,533 | 11/1969 | Harris et al. | 307—284 |

JOHN S. HEYMAN, Primary Examiner

J. D. FREW, Assistant Examiner

U.S. Cl. X.R.

307—252, 284; 332—9